(No Model.)

M. W. DEWEY.
METHOD OF ELECTRIC REFRIGERATION.

No. 413,136. Patented Oct. 15, 1889.

WITNESSES:
C. L. Bendixon.
H. H. Seamans.

INVENTOR,
Mark W. Dewey,
BY
Duell, Laass & Duell,
ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC REFRIGERATION.

SPECIFICATION forming part of Letters Patent No. 413,136, dated October 15, 1889.

Application filed July 20, 1889. Serial No. 318,110. (No model.)

*To all whom it may concern:*

Be it known that I, MARK W. DEWEY, of Syracuse, in the county of Onondaga, in the State of New York, have invented new and useful Improvements in the Method of Electric Refrigeration, of which the following, taken in connection with the accompanying drawings, is a full, clear, and exact description.

The object of my invention is to produce cold by the electric current in such quantities that food may be preserved, ice kept from melting, water frozen, and rooms or receptacles cooled.

My invention consists in establishing an electric circuit having one or more parts adapted to be cooled and one or more parts adapted to be heated by the current therein, locating the cooled part or parts within or in contact with a receptacle, insulating the receptacle from the influence of heat on the exterior thereof, diffusing, conducting, or dissipating the heat from the heated part or parts of the circuit, and exposing the substance to be cooled within said receptacle.

My invention further consists in certain combinations of steps of the method, as will be hereinafter described, and pointed out in the claims.

Figure 1:
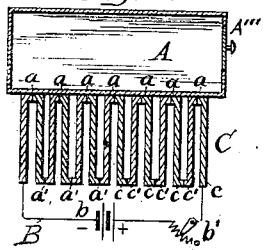
Figure 2:
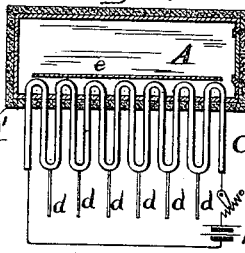
Figure 3:
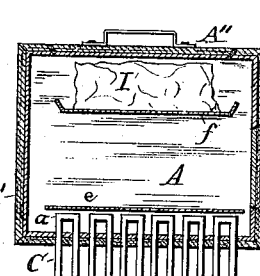
Figure 4:
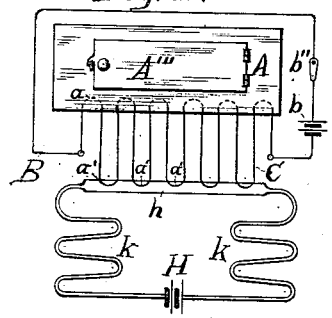
Figure 5:
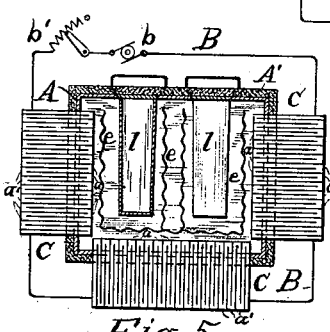
Figure 6:
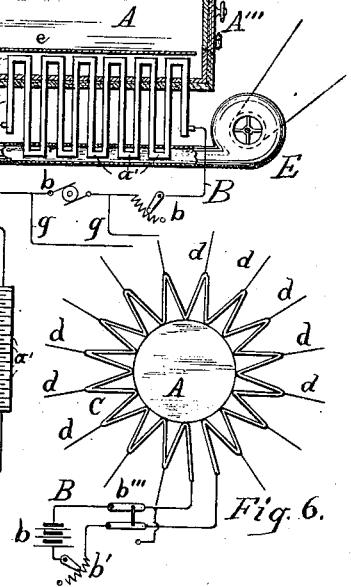
Figure 7:
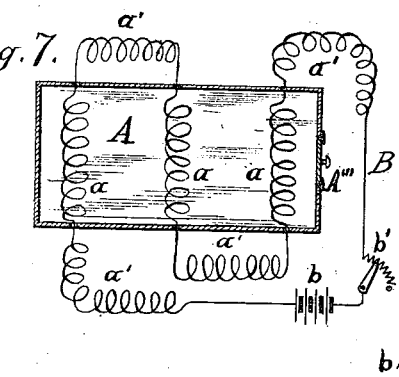
Figure 8:
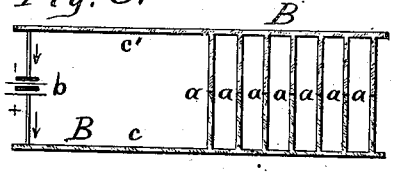
Figure 9:
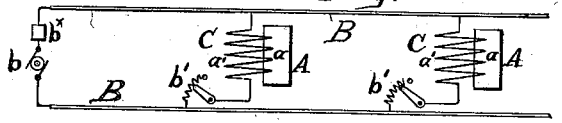
Figure 10:
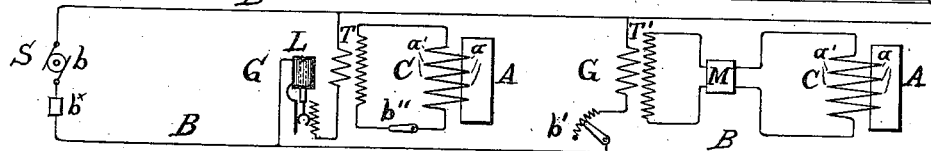

In the accompanying drawings, Figure 1 shows a sectional elevation of a closed receptacle in contact with the cold junctions of a thermo-pile. Fig. 2 shows the cooled parts of a circuit located within the receptacle, heat-non-conducting material on the outside of said receptacle, and heat diffusing or dissipating plates connected to the heated parts of the circuit. Fig. 3 shows ice in the receptacle to be kept frozen and the heated parts of the circuit located in a pipe or conduit through which air is forced to dissipate the heat of the parts. Fig. 4 shows how the heat of the heated parts may be dissipated by the electric current. Fig. 5 shows numerous cooled parts of a circuit on several sides of a freezing-receptacle. Fig. 6 shows a receptacle entirely surrounded by cooled parts, and also shows a current-reverser in the circuit to change the direction of the current to heat instead of cool the receptacle. Fig. 7 shows a cooling or freezing apparatus based on the Thomson effect. Fig. 8 shows a pile formed entirely of cold junctions. Fig. 9 is a diagram of a system showing means whereby the current can be regulated through each freezing apparatus independently of the other, and Fig. 10 shows a diagram of a system where alternating currents are employed and transformers, &c., when necessary.

Referring specifically to the drawings, A represents a section of a receptacle to be cooled or have the heat removed from the interior thereof; B, an electric circuit having parts adapted to be cooled and other parts adapted to be heated by a current flowing in the circuit. $b$ is a battery or source of electricity, and $b'$ an adjustable resistance in said circuit to regulate the current. Part of the circuit B in this case is formed of a thermo-pile C, composed of two metals, such as copper and iron, or bismuth and antimony, or metals having different thermo-electric powers arranged alternately, as usual.

$c$ represents one of the metals of the pile as copper, and $c'$ represents the other as iron. The parts or junctions $a$, cooled by the electric current, are shown in contact with the receptacle, and the parts or junctions $a'$, that are heated by the current, are located at a distance therefrom. The receptacle is preferably of metal in this case, in order to conduct the heat readily from the interior to the cooled junctions. Said cool junctions absorb the heat. Then it is convected to the other junctions, where it is dissipated or radiated. A greater and increased effect is obtained if the receptacle is enveloped in material forming a good non-conductor of heat, as wood or felt, and the effect is still further increased if means are employed to rapidly diffuse or dissipate the heat in the junctions $a'$ from the same.

The above increased effects are made clear by Fig. 2, which shows the receptacle A insulated from the influence of heat on the exterior by a covering or envelope of felt or some other heat-non-conducting material A' and metal plates $d$ of large radiating-surface connected to the warm parts of the circuit. Said plates may be roughened or coated with lamp-black, white lead, or other substance having a great emissive or diffusing power to further aid in dissipating the heat. The current tends to keep the difference of temperatures between the two sets of parts constant. Therefore, if the temperature of the warm parts is kept low, the temperature of the cold parts will be lowered. C in this case represents either a thermo-pile or thermo-spiral, or a conductor formed of one kind of metal having alternate parts differing in structure. I do not limit myself to any particular form of the conductor possessing a part or parts adapted to be cooled by an electric current, for the different constructions of such conductor are almost innumerable. The structure of a metal may be changed by annealing, hardening, heating, magnetizing, &c. The cold parts $a$ are shown in this figure located within the receptacle. This arrangement still further increases the cooling of the interior. A metal plate $e$ is fixed in close proximity to the cold parts and tends to conduct the heat to said parts. The plate also serves as a support for anything to be cooled within the receptacle. The other parts of the figure are the same or similar to that shown and described in referring to Fig. 1, and are correspondingly lettered.

Hereinafter only the differentiating features of the figures will be referred to for the sake of brevity, the remaining or like parts having like letters of reference.

In Fig. 3 the receptacle A is a refrigerator or ice-chamber having an envelope of wood A', instead of felt, surrounding the metal part. In some cases the receptacle may be constructed entirely of wood or other heat-non-conducting material. A block of ice I is shown in this case supported on a shelf $f$ within the refrigerator. The cold parts of C, located within, prevent the ice from melting or from melting rapidly, according to the power of the apparatus, depending upon the number of the cold parts, the structure of the metal or metals composing them, and the strength of the current flowing through them. The cover A'' is provided to admit the ice to the refrigerator. The heat of the warm parts is carried off or dissipated in this case by passing a current of air through the conduit D, in which are located the warm parts, by a rotating fan or blower E. It will be obvious that a current of cool water in the conduit would have the same effect. In that case, however, the warm parts may be insulated by coating them with suitable paint or enamel to prevent the current short-circuiting through the water. The same may be done in either or both cases to insulate the parts from the conduit when it is constructed of metal. The source of electricity shown in the circuit in this case is in the form of a dynamo, and auxiliary leads $g$ $g$ are indicated leading to some other translating device to be supplied with current.

Fig. 4 shows another method of conducting or dissipating the heat from the hot parts. This method consists in establishing an electric circuit having the power to reduce differences of temperature in the same. Such a circuit may be formed of copper. A portion $h$ of the circuit is arranged in contact with the hot parts, or with thin electric insulating material, as mica, between the said portion and parts, and the heat of the parts is conducted to said portion of the circuit and warms the same. One or more cooling-coils $k$ are in the said circuit, having their convolutions separated by air-spaces. These coils serve to radiate the heat that is convected from the warm portion $h$ to said coils or cooler portions by the current from the battery H. $b''$ in circuit B is a common circuit maker and breaker. A''' represents the door in each of the receptacles described to admit any material or substance to be cooled.

Fig. 5 represents the receptacle A, designed to freeze water. The water is contained in vessels or molds $l$ $l$, the one on the left being shown in section. The thermo-pile C is shown constructed very close and solid in this figure, and the cold parts extend within the receptacle on several sides of the same. The conducting-plate $e$ within the receptacle is corrugated to improve its effect by giving a larger surface of contact and extends between the ice-molds $l$ $l$. Preferably an uncongealable medium, as brine, is contained in the receptacle A and surrounds the molds. Such a liquid will store the cold or prevent rapid admission of heat to the interior when the receptacle is opened, as when a mold is removed. The metal bars $c$ and $c'$ may be electrically insulated from each other and from the receptacle and medium with gypsum or paint or enamel of suitable material. The water in the molds, or the uncongealable medium, may be agitated in any suitable manner, if desired, to assist the congelation or conduction of heat from the molds to the pile, or both. In this case the substance to be cooled may be said to be exposed to the cooling influence of the said medium.

Fig. 6 shows the cold parts completely surrounding the receptacle A and in contact with the same, as shown in Fig. 1, and the heat of the warm parts diffused, as in Fig. 2. $b'''$ is a current-reverser for reversing the current from the battery $b$ through the pile to reverse the effect of the parts in contact with the receptacle—viz., to heat instead of cool the receptacle or its contents. In this way water may be boiled or a substance baked within said receptacle.

Fig. 7 shows an electric circuit which has cooling parts in connection with or leading through the receptacle several times; but said circuit is formed of but one metal or alloy throughout. This metal may be iron. The effect of a current flowing in an iron circuit is to exaggerate or increase differences of temperature therein. $a$ $a$ $a$ represent the parts to be cooled or to absorb the heat from the receptacle A, and are located therein, and $a'$ $a'$ $a'$ are the parts to which the heat is conducted or convected by the current and then radiated or diffused therefrom. The said parts are shown as and may be in some cases spirals or coils, but in other cases may be straight or simply waved. The exterior or warm coils $a'$ are heated at the commencement of the operation by applying heat from some external source, as gas-jets, an electric heating device, or, what is the same thing, cooling the interior of the receptacle by locating ice or a freezing mixture therein. Said coils may be maintained at a higher temperature than those on the interior by reducing the cross-section of the conductor forming them—that is, forming them of smaller wire than the balance of the circuit. After the heat is once located in the warm parts said heat will generally be maintained without a further application of external heat, simply through the convection. The heat should not in this case be dissipated too rapidly or the difference between the temperatures in the said parts will not be sufficiently great to produce a rapid effect. The conductor forming the circuit may be insulated from the receptacle and the latter insulated from heat on the exterior thereof, as before described. The warm coils may be located at some distance from the receptacle.

Fig. 8 represents a thermo-pile having none but cold junctions $a$—that is, if the current is permitted to flow in the proper direction. If allowed to flow in the opposite direction, they would, of course, be hot junctions. The circuit is composed of two metals, as copper and iron, $c$ indicating the copper part and $c'$ the iron part. The heat in this case is convected from the junctions $a$ or cold parts to other parts of the circuit remote therefrom and there dissipated.

Fig. 9 shows several freezing apparatuses in multiple-arc connection in the same circuit B, and $b^x$ is a suitable current-regulator therein with the dynamo $b$. C C indicate the thermo-piles in connection with the receptacles A A, and $b'$ $b'$ indicate the adjustable resistances, whereby the current may be independently regulated through said piles.

Fig. 10 represents a diagram of a system where alternating currents generated at a central station S are employed as the source of electricity and transformed or converted, as desired, at the different sub-stations G and G'. T and T' indicate suitable inductional transformers at the respective stations, which are constructed to transform the current as required, depending upon the character of the primary current and the requirements of the freezing apparatus. It will be sufficient to state that the rate at which the heat is absorbed or evolved depends upon the nature of the metals, (not upon their resistance,) upon the temperature of the junctions, and upon the current strength, (not upon the square thereof.) It is quite distinct, therefore, from the Joule effect. The latter may mask the Peltier effect (the cooling or heating of a junction of two metals by a current) if the volume of the current is too great or the resistance at the junctions too high.

The thermo-pile C in Fig. 10 is located in the secondary circuit of the transformer. The automatic variable resistance L at G maintains the current flowing through the pile uniform by increasing the resistance upon an increase in strength of the current. At station G the cooling or freezing apparatus C is supplied with an alternating current and may be the same or similar to that shown in Fig. 7. The cooling and freezing apparatus at station G' is designed to produce its effect by a continuous direct current. For this reason a suitable current rectifier or straightener M is placed in the secondary circuit to straighten the currents therein.

It will be evident that many changes in the construction and relative arrangement of parts may be resorted to, and also variations may be made in the method, without departing from the spirit and scope of my invention, and I would have it understood that I do not limit myself to the particular construction, arrangement of parts shown, or to the precise or exact method herein described.

Having described my invention, what I claim as new, and desire to secure by Letters Patent, is—

1. The method of electric cooling or freezing, consisting in establishing an electric circuit having one or more parts adapted to be cooled and one or more parts adapted to be heated by the current therein, locating the cooled part or parts within or in contact with a receptacle to cool the interior thereof, and diffusing or conducting the heat from the heated part or parts of the circuit.

2. The method of electric cooling or freezing, consisting in establishing an electric circuit having one or more parts adapted to be cooled and one or more parts adapted to be heated by the current therein, locating the cooled part or parts within or in contact with a receptacle to cool the interior, insulating said receptacle from the influence of heat on the exterior, and diffusing or conducting the heat from the heated part or parts of the circuit.

3. The method of electric cooling or freezing, consisting in establishing an electric circuit having one or more parts adapted to be cooled by the current therein, locating said part or parts within or in contact with a receptacle containing an uncongealable medium, insulating said receptacle from the influence of heat on the exterior thereof, and exposing the substance to be cooled to the cooling influence of said medium.

4. The method of electric cooling or freezing, consisting in establishing an electric circuit having one or more parts adapted to be cooled by the current therein, locating said part or parts within or in contact with a refrigerator or ice-chamber, and exposing the substance to be cooled within the said refrigerator.

5. The method of cooling or freezing a substance contained in a receptacle, consisting in removing the heat from the interior of said receptacle by or through the convection of heat produced by an electric current or currents.

6. The method of electric cooling or freezing, consisting in establishing an electric circuit having one or more parts adapted to be cooled by the current therein, locating said part or parts within or in contact with a receptacle containing an uncongealable medium, electrically insulating the receptacle and medium from the circuit, insulating said receptacle from the influence of heat on the exterior thereof, and exposing the substance to be cooled to the cooling influence of said medium.

7. The method of electric cooling or freezing, consisting in establishing an electric circuit having one or more parts adapted to be cooled by the current therein, locating said part or parts within or in contact with a receptacle, electrically insulating the receptacle from the circuit, insulating the said receptacle from the influence of heat on the exterior thereof, and exposing the substance to be cooled within said receptacle.

8. The method of electric cooling or freezing, consisting in establishing an electric circuit having one or more parts adapted to be cooled and one or more parts adapted to be heated by the current therein, locating the cooled part or parts within or in contact with a receptacle, electrically insulating the same from the circuit, insulating the receptacle from the influence of heat on the exterior thereof, diffusing or conducting the heat from the heated part or parts of the circuit, and exposing the substance to be cooled within said receptacle.

9. The method of electric cooling or freezing, consisting in establishing an electric circuit having one or more parts adapted to be cooled and one or more parts adapted to be heated by the current therein, locating the cooled part or parts within or in contact with a receptacle, insulating the receptacle from the influence of heat on the exterior thereof, locating the heated part or parts of the circuit within or in contact with a conduit, passing a current of water or air through the conduit to dissipate the heat of said part or parts of the circuit, and exposing the substance to be cooled to the cooling effect of the said receptacle.

10. The method of electric cooling or freezing, consisting in establishing an electric circuit having one or more parts adapted to be cooled and one or more parts adapted to be heated by the current therein, locating the cooled part or parts within or in contact with a receptacle, insulating the receptacle from the influence of heat on the exterior thereof, diffusing or conducting the heat from the heated part or parts of the circuit, and exposing water to be frozen in a vessel within said receptacle containing an uncongealable medium.

11. The method of electric cooling or freezing, consisting in establishing an electric circuit, including a thermo-pile, locating the alternate junctions adapted to be cooled by the current within or in contact with a receptacle to be cooled, and dissipating or conducting the heat from the heated junctions.

12. The method of electric cooling or freezing, consisting in establishing an electric circuit, including a thermo-pile, locating the alternate junctions adapted to be cooled by the current within or in contact with a receptacle to be cooled, insulating said receptacle from the influence of heat on the exterior thereof, and dissipating or conducting the heat from the heated junctions.

13. In a system of electric cooling or freezing, consisting in connecting two or more thermo-piles or conductors having parts adapted to be cooled by a current flowing therein in multiple arc relations with leads from a suitable source of electricity, and regulating the current flowing through the thermo-piles or conductors independently of each other.

14. In a system of electric cooling or freezing, consisting in connecting two or more thermo-piles or conductors having parts adapted to be cooled by a current flowing therein in multiple-arc relation with leads from a suitable source of electricity, locating the cooled parts of each of said thermo-piles or conductors within or in contact with a suitable receptacle to be cooled, and regulating the current flowing through the said thermo-piles or conductors by any suitable and well-known method.

In testimony whereof I have hereunto signed my name this 17th day of July, 1889.

MARK W. DEWEY. [L. S.]

Witnesses:
C. H. DUELL,
H. M. SEAMANS.